J. R. W. MENGER.
COVER HOLDER FOR POTS.
APPLICATION FILED JAN. 2, 1914.

1,125,585.

Patented Jan. 19, 1915.
2 SHEETS—SHEET 1.

WITNESSES:

INVENTOR
Joseph R. W. Menger
BY
Ashley Cohen
ATTORNEYS

J. R. W. MENGER.
COVER HOLDER FOR POTS
APPLICATION FILED JAN. 2, 1914.
1,125,585.
Patented Jan. 19, 1915.
2 SHEETS—SHEET 2.
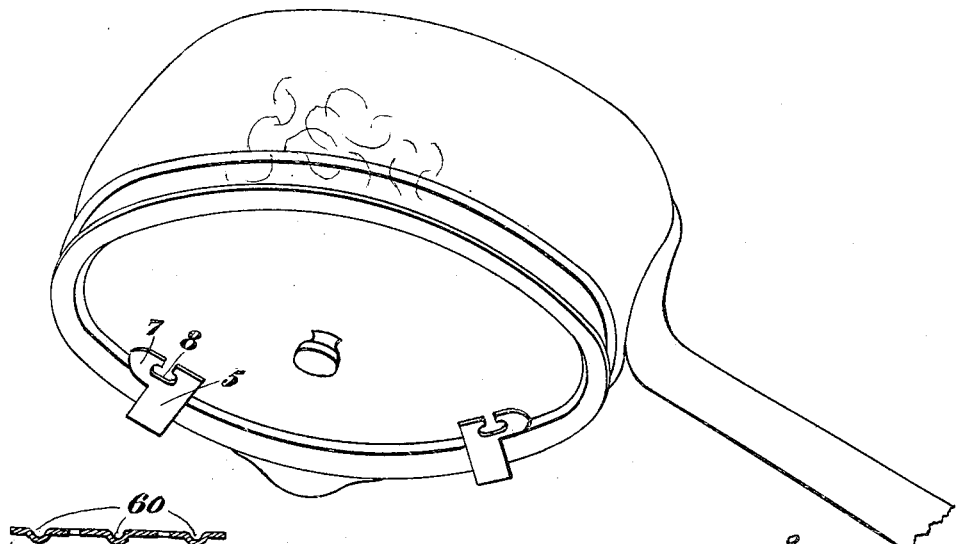
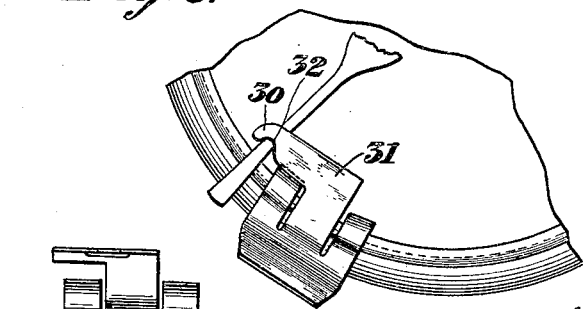
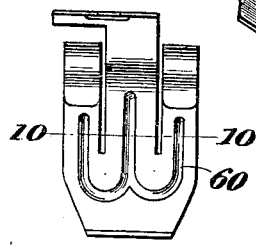
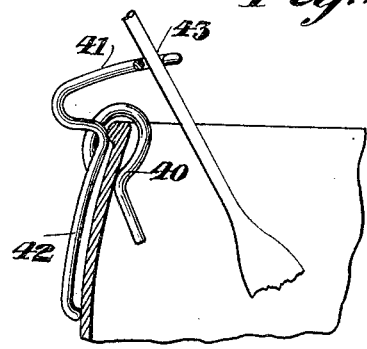
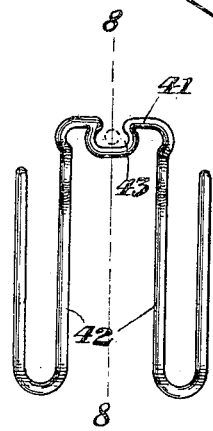
Fig. 3.
Fig. 8.
Fig. 4.
Fig. 5.
Fig. 7.
Fig. 6.
WITNESSES:
INVENTOR
Joseph R. W. Menger
BY
Ashley & Cohen
ATTORNEYS

UNITED STATES PATENT OFFICE.

JOSEPH R. W. MENGER, OF RED BANK, NEW JERSEY, ASSIGNOR OF ONE-HALF TO DANIEL C. BUTTS, OF NEW YORK, N. Y.

COVER-HOLDER FOR POTS.

1,125,585.  Specification of Letters Patent.  Patented Jan. 19, 1915.

Application filed January 2, 1914. Serial No. 809,818.

*To all whom it may concern:*

Be it known that I, JOSEPH R. W. MENGER, a citizen of the United States, and a resident of Red Bank, in the county of Monmouth and State of New Jersey, have invented certain new and useful Improvements in Cover-Holders for Pots, of which the following is a specification.

This invention relates to cover holders for pots.

One object of the invention is to provide a cover holder of inexpensive construction to fit various sizes of pots or other receptacles of similar nature through which holder the cover may be retained in place while the receptacle is turned over for the purpose of straining the contents such as potatoes, etc.

Another object is to provide cover holder units, two of which may be applied to fit different sized receptacles and be adjustably held thereon adjacent the bead at any desired distance from each other.

Still another object is to provide in a holder of this character means whereby a spoon or similar utensil may be held in fixed position in the receptacle.

Further objects and advantages will appear from the following detailed description and the features of novelty will be particularly pointed out in the claims.

Figure 1:
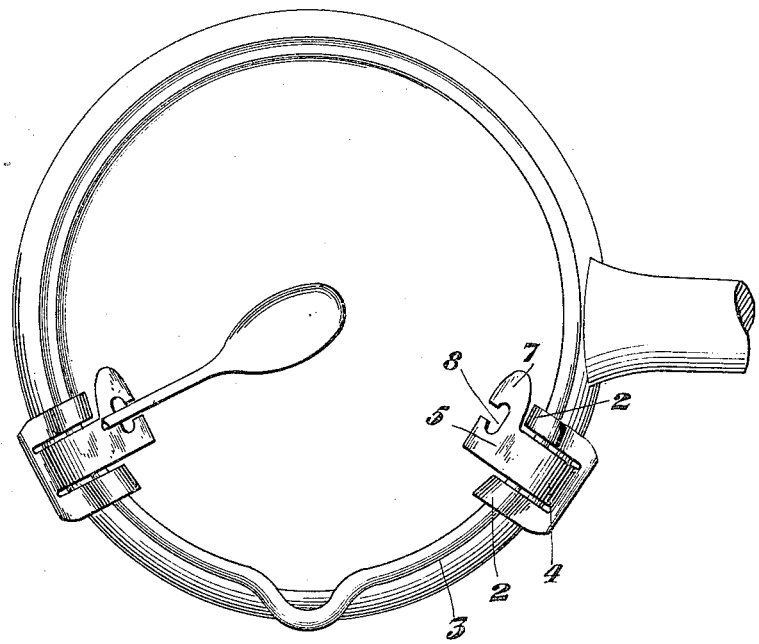
Figure 2:
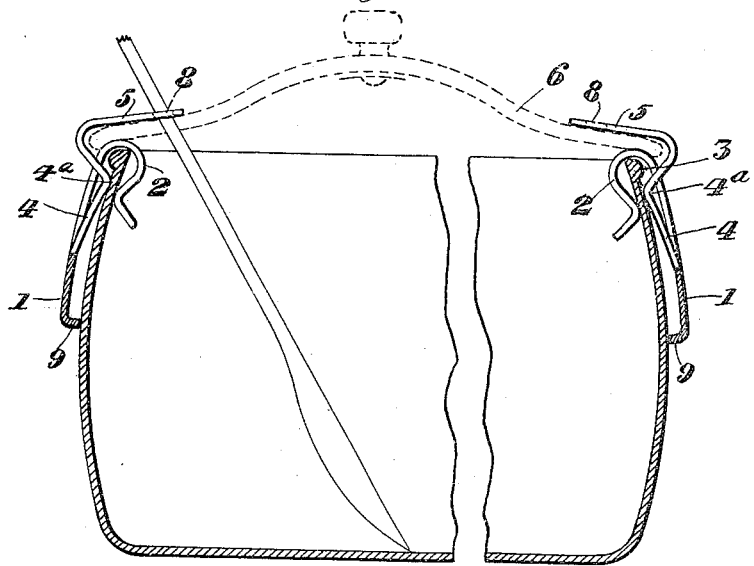

In the accompanying drawings, Figure 1 is a plan view of the cover holder applied to a pot and showing the manner in which the same serves as a spoon rest. Fig. 2 is a side elevation of the cover holder applied to a pot illustrating the manner in which the cover is retained in place and further illustrating the manner in which the spoon is held. Fig. 3 is a perspective view of a pot provided with my improved cover holder held in position for straining. Fig. 4 illustrates the cover holder with a modified form of spoon rest. Fig. 5 is a front view of a wire holder made according to my invention. Fig. 6 is a sectional view of the holder shown in Fig. 5, taken along the line 8—8. Fig. 7 is a still further modification showing a cover holder made of very thin sheet metal with reinforcing ribs formed therein. Fig. 8 is a section taken along the line 10—10 of Fig. 7.

Referring in detail to Figs. 1, 2, and 3, the cover holder may be stamped of spring sheet metal and consists of a body portion 1 which is adapted to contact the outer surface of the receptacle. On each side of said body portion are spring ears 2 which are adapted to snap over the bead 3 of the pot and clamp the sides thereof below the bead. Between the ears 2 and extending upward from the body 1, is a neck 4, having an inwardly bent portion 4$^a$ which snaps under the bead of the pot, and in conjunction with the ears serves to rigidly clamp the holder firmly to the pot. Due to the resiliency of the spaced ears and the neck, the device may be attached to pots or other similar receptacles of various sizes, the walls of which are of varying thicknesses. Referring to Fig. 1, it will be seen that the ears readily accommodate themselves to the curved contour of the receptacle. Integral with the neck is a head portion 5 which is bent outwardly and then inwardly to overlap the edge of the receptacle and the lower surface thereof is raised above the upper edge of the wall a sufficient distance to allow of the insertion of a cover 6 therebetween. The head portion 5 being also resilient will admit of the insertion of various shaped covers. At the end of the head portion 5, I preferably form an extension 7 and form a jaw 8 therein to act as a holding means for a spoon as illustrated. It will thus be seen that when the cover is not used and it is necessary to use a spoon from time to time to stir the contents of the receptacle or for any other purpose, the jaw or socket 8 will serve as a convenient means for retaining the spoon in fixed position and prevent it from sliding down to the bottom of the receptacle. It will be noted that the holder may be adjusted to any position upon the wall of the receptacle and as many of them as desired may be used although two would be sufficient for most purposes as illustrated in Figs. 1, 2 and 3. As shown in Fig. 3, the pot may be turned almost upside down without danger of the cover falling off. Convenient means is thus afforded whereby if desired the liquid in the pot may be drawn off from the solid matter by simply tilting the pot and the liquid will flow between the cover and the adjacent edge of the wall, leaving the solid matter behind. The weight of the latter against the cover merely tends to hold the same more firmly in place as clearly appears from Fig. 3. With the cover thus applied to the pot, all danger of scalding the hands is eliminated when the material in the receptacle is steaming and it is desired to draw off the liquid. To facilitate the removal of the holder from the receptacle, I form an inwardly projecting transverse tail portion 9 upon the body which may be conveniently grasped and by pushing upward thereupon the holder may easily be removed. This tail portion forms the point of contact of the body of the holder with the pot, thus spacing the body of the holder away therefrom. It will be seen, therefore, that no matter how the curvature of the pot may vary the holder will engage the same at predetermined points calculated to firmly hold the holder to the pot.

In Fig. 4, I have shown the improved holder formed with a modified socket for the spoon. The extension 30 of the head portion 31 is provided with a shallow recess 32 adjacent to the edge of the wall of the receptacle. The spoon may be snapped into the recess past the rounded end of the extension 30.

In Figs. 5 and 6, I have illustrated a wire cover holder having ears 40, head 41, body portion 42 and a socket for a spoon 43, all as shown in the foregoing forms.

In Figs. 7 and 8, I have illustrated a cover holder made of thinner sheet metal than the holder shown in the other forms and provide the same with ribs 60 stamped out of the material to act as stiffening means. In this form, there is therefore a saving of material and sufficient stiffness is obtained by reason of the ribs.

It will thus be seen that I have provided a cover holder for pots and other receptacles of similar character which may be adjustably applied to the wall of receptacles of various sizes and thicknesses. In the preferred forms of my invention, novel means are utilized for securely attaching the holder to the pot, at the same time permitting the holder to be readily detached. The holder is preferably stamped out of sheet metal but it may also be formed of wire without departing from my invention. When the cover is not in use, and it is necessary to use a spoon for stirring the contents of the receptacle, the cover holder provides means for the retention of the spoon in a fixed position so that the latter will not slide down to the bottom of the receptacle.

Having thus described my invention, I claim as new and desire to secure by Letters Patent:

1. A cover holder for receptacles made out of an integral piece of spring metal comprising a body portion, the lower end of which is inturned to abut the outside wall of the receptacle, three prong shaped members extending from said body member, the two outside prongs being overturned so as to straddle and grip the wall of the receptacle and the middle prong being bent to form a shoulder for engaging the bead of the receptacle and the remaining portion of the prong being bent so as to overhang the wall and be spaced therefrom constituting a socket for the reception of the edge of the cover.

2. A cover holder for receptacles made out of an integral piece of spring metal comprising a body portion, the lower end of which is inturned to abut the outside wall of the receptacle, three prong shaped members extending from said body member substantially parallel to each other, the two outside prongs being bent so as to straddle and clamp the wall of the receptacle, the tip of each of said outside prongs being bent outwardly so as to be out of contact with the inside surface of the wall, and the middle prong being bent inwardly to form a shoulder which engages the bead of the receptacle and the remaining portion of the prong being bent so as to overhang the wall and be spaced therefrom constituting a socket for the reception of the edge of the cover.

3. A cover holder for receptacles made out of an integral piece of spring wire bent to form a body comprising two spaced U shaped members, the lower end of said body members being bent inwardly to contact the outside surface of the wall of the receptacle, a prong extending from the outer branch of each body member adapted to straddle and clamp the wall, and a loop extending from the inside branches of the body members, said loop being bent so as to form a shoulder for engaging the bead and the end of said loop being bent to overhang the wall of the receptacle and be spaced therefrom to constitute a socket for the insertion of the edge of the cover.

4. A cover holder for receptacles made out of an integral piece of spring wire bent into two spaced substantially parallel loops which are adapted to engage the outside surface of the wall of the receptacle, an overturned prong extending from the outside branches of the loops and straddling the wall to clamp the same, the end of said prongs being bent upwardly out of contact with the wall, a loop connecting the two first mentioned loops and bent so as to form a rounded shoulder for engaging the bead of the receptacle, the remaining portion of the loop being bent to overhang the wall and spaced from the edge thereof to constitute a socket for the receptacle of the edge of the cover.

Signed at New York city, in the county of New York and State of New York this 23rd day of December A. D. 1913.

JOSEPH R. W. MENGER.

Witnesses:
WM. I. COHEN,
EMILY V. HAUSER.

Copies of this patent may be obtained for five cents each, by addressing the "Commissioner of Patents, Washington, D. C."